United States Patent
Tang

(10) Patent No.: US 12,035,257 B2
(45) Date of Patent: Jul. 9, 2024

(54) POSITION INFORMATION PROCESSING METHOD, DEVICE AND STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 498 days.

(21) Appl. No.: 17/213,913

(22) Filed: Mar. 26, 2021

(65) Prior Publication Data

US 2021/0219249 A1 Jul. 15, 2021

Related U.S. Application Data

(63) Continuation of application No. PCT/CN2018/108089, filed on Sep. 27, 2018.

(51) Int. Cl.
| | | |
|---|---|---|
| H04W 56/00 | (2009.01) | |
| H04L 27/26 | (2006.01) | |
| H04W 72/0446 | (2023.01) | |
| H04W 72/23 | (2023.01) | |
| H04W 72/53 | (2023.01) | |

(52) U.S. Cl.
CPC ..... *H04W 56/001* (2013.01); *H04L 27/26025* (2021.01); *H04W 72/0446* (2013.01); *H04W 72/23* (2023.01); *H04W 72/53* (2023.01)

(58) Field of Classification Search
CPC ... H04W 56/001; H04W 72/53; H04W 72/23; H04W 72/0446; H04L 27/26025
See application file for complete search history.

(56) References Cited

U.S. PATENT DOCUMENTS

2018/0192383 A1 7/2018 Nam et al.

FOREIGN PATENT DOCUMENTS

| CN | 108064466 A | 5/2018 |
| CN | 108401527 A | 8/2018 |

OTHER PUBLICATIONS

The EESR of corresponding European application No. 18935532.4, dated Aug. 4, 2021.
CATT:"Remaining Issues on RMSI", 3GPP Draft; R1-1801709 RMSI, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018 Feb. 17, 2018(Feb. 17, 2018), XP051397691.

(Continued)

*Primary Examiner* — Natasha W Cosme
(74) *Attorney, Agent, or Firm* — Ladas & Parry LLP

(57) ABSTRACT

The present application discloses an information processing method, including: the terminal device detects a synchronous signal block (SSB) and a physical downlink control channel (PDCCH) of the RMSI in a control resource set of the remaining minimum system information (CORESET of the RMSI) associated with the SSB; information about a time domain candidate position of the CORESET of the RMSI associated with the SSB is determined based on a time domain parameter impact factor of the SSB. The present application also discloses another information processing method, device and storage medium.

18 Claims, 3 Drawing Sheets

A terminal device detects, within a sub-band, a SSB and detects a control resource set of RMSI associated with the SSB — S201

(56) References Cited

OTHER PUBLICATIONS

Oppo:"RMSI PDCCH monitoring window configuration", 3GPP Draft; R1-1802135 RMSI PDCCH Monitoring Window Configuration, 3rd Generation Partnership Project (3GPP), Mobile Competence Centre; 650, Route Des Lucioles; F-06921 Sophia-Antipolis Cedex; Fran, vol. RAN WG1, No. Athens, Greece; Feb. 26, 2018-Mar. 2, 2018 Feb. 15, 2018(Feb. 15, 2018), XP051396867.
Samsung:"Remaining details on remaining minimum system information delivery", 3GPP Draft; R1-1715910-RMSI Delivery, 3GPP Draft; R1-1715910-RMSI Delivery, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017(Sep. 17, 2017), XP051339369.
The international search report of PCT application No. PCT/CN2018/108089 dated Jun. 21, 2019.
CATT; "Summary of Offline Discussion on RMSI": 3GPP TSG RAN WG1 Meeting AH 1801, R1-1800230; Vancouver, Canada, Jan. 22-26, 2018; (Jan. 26, 2018).

A terminal device detects, within a sub-band, a SSB and detects a control resource set of RMSI associated with the SSB — S201

FIG. 4

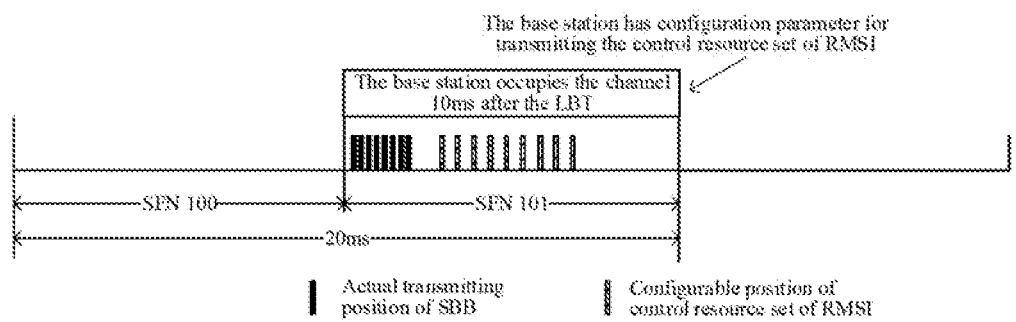

FIG. 5

The network device determines information about a time domain candidate position of a SSB and information about a time domain candidate position of a CORESET of RMSI associated with the SSB, so that the SSB and a CORESET of the RMSI associated with the SSB are transmitted within one time domain interval — S301

FIG. 6

Terminal device — 400

Detecting unit 401

FIG. 7

POSITION INFORMATION PROCESSING METHOD, DEVICE AND STORAGE MEDIUM

CROSS-REFERENCE TO RELATED APPLICATIONS

This application is a continuation of International Application No. PCT/CN2018/108089, filed on Sep. 27, 2018, entitled "INFORMATION PROCESSING METHOD, DEVICE AND STORAGE MEDIUM", the content of which is incorporated herein by reference in its entirety.

TECHNICAL FIELD

The present application relates to the technical field of wireless communication, and in particular, to an information processing method, a device and a storage medium.

BACKGROUND

In the new radio (NR) Rel-15 system, the time domain candidate position at which the synchronization signal block (SS/PBCH block, SSB) is transmitted and the time domain candidate position of the control resource set (CORESET) of the remaining minimum system information (RMSI) associated with the SSB is specified. However, due to the large time domain distance between the SSB and the CORESET of the RMSI associated with the SSB, when the network device successfully seizes an available channel (e.g. 10 ms) for a period of time through listen before talk (LBT) in an unauthorized frequency band, the network device cannot transmit a complete SSB and the PDCCH of the RMSI transmitted in the CORESET of the RMSI associated with the SSB in the available channel. Therefore, it is not conducive to the discovery and access of unauthorized frequency band cells.

SUMMARY

To solve the above technical problems, the embodiments of the present application provide an information processing method, a device and a storage medium, which realize the transmission of a complete SSB and the PDCCH of the RMSI in the CORESET of the RMSI associated with the SSB in one available channel, thus improving the probability of discovery and access of unauthorized frequency band cells.

In a first aspect, an embodiment of the present application provides an information processing method, including: detecting, by a terminal device, a SSB and detecting a PDCCH of the RMSI within a CORESET of the RMSI associated with the SSB; where information about a time domain candidate position of the CORESET of the RMSI associated with the SSB is determined based on a time domain parameter impact factor of the SSB.

In a second aspect, an embodiment of the present application provides an information processing method, including: determining, by a network device, information about a time domain candidate position of a SSB and information about a time domain candidate position of a CORESET of the RMSI associated with the SSB, so that the SSB and a PDCCH of the RMSI in the CORESET of the RMSI associated with the SSB are transmitted within one time domain interval; where the information about the time domain candidate position of the CORESET of the RMSI associated with the SSB is determined based on a time domain parameter impact factor of the SSB.

In a third aspect, an embodiment of the present application provides a terminal device, the terminal device includes a detecting unit, configured to detect a SSB and detect a PDCCH of the RMSI within a CORESET of the RMSI associated with the SSB within one time domain interval;

the information about a time domain candidate position of the CORESET of the RMSI associated with the SSB is determined based on a time domain parameter impact factor of the SSB.

In a fourth aspect, an embodiment of the present application provides a network device, including: a processing unit, configured to determine information about a time domain candidate position of a SSB and information about a time domain candidate position of a CORESET of the RMSI associated with the SSB, so that the SSB and a PDCCH of the RMSI in the CORESET of the RMSI associated with the SSB are transmitted within one time domain interval;

the information about a time domain candidate position of the CORESET of the RMSI associated with the SSB is determined based on a time domain parameter impact factor of the SSB.

In a fifth aspect, an embodiment of the present application provides a terminal device, including: a processor and a memory for storing a computer program capable of running on the processor, where the processor is configured to execute the steps of the method executed by the above terminal device when the computer program is run.

In a sixth aspect, an embodiment of the present application provides a network device, including a processor and a memory for storing a computer program capable of running on the processor, where the processor is configured to execute the steps of the method executed by the above network device when the computer program is run.

In a seventh aspect, an embodiment of the present application provides a storage medium in which an executable program is stored, and the method executed by the above terminal device is implemented when the executable program is executed by a processor.

In an eighth aspect, an embodiment of the present application provides a storage medium in which an executable program is stored, and the method executed by the above network device is implemented when the executable program is executed by a processor.

According to the information processing method provided by an embodiment of the present application, the terminal device detects the SSB within one time domain interval and a PDCCH of the RMSI within the CORESET of the RMSI associated with the SSB; and the information about a time domain candidate position of the CORESET of the RMSI associated with the SSB is determined based on a time domain parameter impact factor of the SSB. In this way, the network device is enabled to transmit a complete SSB and a CORESET of the RMSI associated with the SSB to the terminal device within an available channel; thus improving the discovery and access probability of unauthorized frequency band cells.

BRIEF DESCRIPTION OF DRAWINGS

FIG. 4 is an optional processing flow diagram of the information processing method for the terminal device according to an embodiment of the present application;

FIG. 5 is a schematic diagram of the SSB and the CORESET of the RMSI associated with the SSB according to an embodiment of the present application;

FIG. 6 is an optional processing flow diagram of the information processing method for the network device according to an embodiment of the present application;

FIG. 7 is a schematic diagram of the composition and structure of the terminal device provided by an embodiment of the present application;

DESCRIPTION OF EMBODIMENTS

In order to understand the characteristics and technical contents of the embodiments of the present application in more detail, the implementation of the embodiments of the present application will be described in detail with reference to the drawings, which are for reference only and are not used to limit the embodiments of the present application.

Before describing the embodiments of the present application in detail, the candidate transmitting position of the SSB within a slot is briefly described.

The candidate transmitting position of the SSB is planned and configured within 5 ms, and the candidate configuring position of the CORESET of the RMSI associated with SSB is planned and configured within 20 ms. The time domain interval position between a certain SSB and a CORESET of the RMSI associated with the SSB will be quite different according to different configurations. In the research of unauthorized frequency bands of 5G, it is difficult to ensure that the complete SSB and the CORESET of the RMSI associated with the SSB can be transmitted/received in the resources occupied after a successful LTB, because the transmission opportunities after a successful LBT are limited and the position of successful LBT is uncertain.

Figure 1:
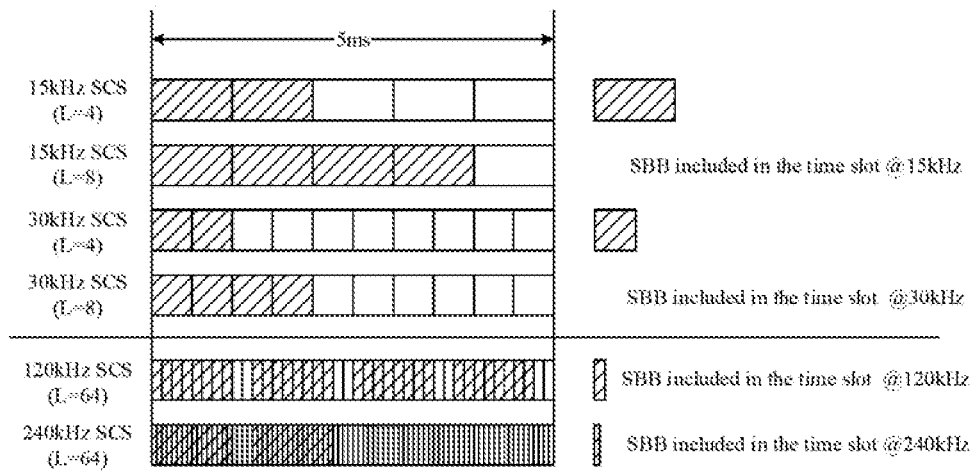
FIG. 1 is a schematic diagram of candidate transmitting positions of the SSB within a slot in related technologies.

The candidate transmitting positions of the SSB within a slot are shown in FIG. 1 in related technologies. The candidate transmitting position of the CORESET of the RMSI is: position of two slots starting from the $n_0 = (O \cdot 2^\mu + \lfloor i \cdot M \rfloor) \bmod N_{slot}^{frame, \mu}$ -th slot for which a system frame number satisfies SFN$_C$ mod 2=0 (when $$\text{(when } \lfloor (O \cdot 2^\mu + \lfloor i \cdot M \rfloor) / N_{slot}^{frame,\mu} \rfloor \bmod 2 = 0)$$

or

SFN$_C$ mod 2=1 (when $$\text{(when } \lfloor (O \cdot 2^\mu + \lfloor i \cdot M \rfloor) / N_{slot}^{frame,\mu} \rfloor \bmod 2 = 1).$$

Figure 2:
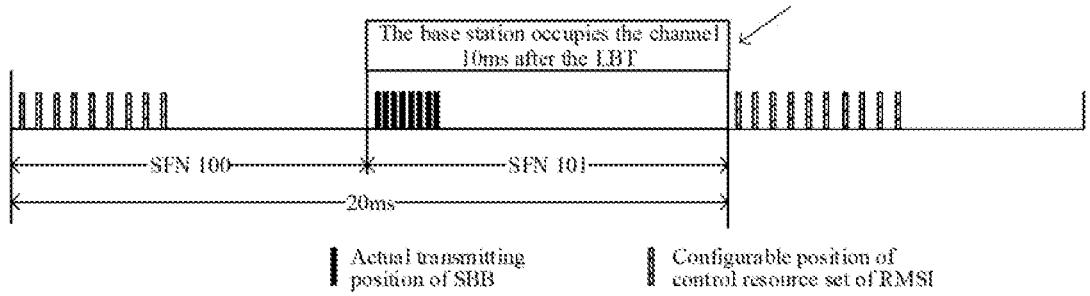
FIG. 2 is a schematic diagram of the transmitting/receiving positions of the SSB and the CORESET of the RMSI associated with the SSB in related technologies.

FIG. 2 is a schematic diagram of the transmitting/receiving positions of the SSB and the CORESET of the RMSI associated with the SSB in related technologies; the configuration modes for the transmitting/receiving positions of the SSB and the CORESET of the RMSI associated with the SSB shown in FIG. 2 are all reasonable and available. In the embodiment, the network device, based on its own schedule, transmits the SSB in the first half of each odd frame and transmits the CORESET of the RMSI associated with each SSB in the first half of each even frame. However, due to the large time domain distance between the SSB and the CORESET of the RMSI associated with the SSB, when a network device successfully seizes an available channel (e.g. 10 ms) through LBT in an unauthorized frequency band, the network device still cannot transmit a complete SSB and a CORESET of the RMSI associated with the SSB in the available channel.

Based on the aforementioned problem, the present application proposes to increase the value range of a parameter O on the basis of calculating the position information of the CORESET of the RMSI associated with the SSB in related technologies.

In an embodiment, the value range of O is modified from O=0, 2, 5, 7 in related technologies to O=0, 2, 5, 7, 10, 12, 15, 17 in a first frequency domain range.

In an embodiment, the ranges of value O include O=1, 2.5, 6, 7.5 and O=11, 12.5, 16, 17.5.

Based on the aforementioned problem, the present application further provides an information processing method, the information processing method of an embodiment of the application can be applied to various communicating systems, such as global system of mobile communication (GSM), code division multiple access (CDMA) system, wideband code division multiple access (WCDMA) system, general packet radio service (GPRS), long term evolution (LTE) system, LTE frequency division duplex (FDD) system, LTE time division duplex (TDD), universal mobile telecommunications system (UMTS), worldwide interoperability for microwave access (WiMAX) communicating system or 5G system, etc.

Figure 3:
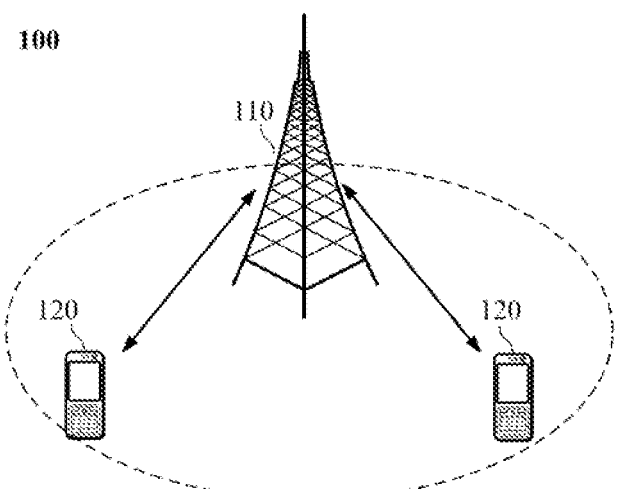
FIG. 3 is a schematic structural diagram of a communicating system provided by an embodiment of the present application.

Exemplary, the communicating system 100 applied by the embodiment of the application is shown in FIG. 3. The communicating system 100 may include a network device 110, which may be a device that communicates with a terminal device 120 (or called a communication terminal or a terminal). The network device 110 may provide communication coverage for a specific geographical area, and communicate with the terminal devices located in the coverage area. In an embodiment, the network device 110 may be a base transceiver station (BTS) in a GSM system or a CDMA system, a base station (NodeB, NB) in a WCDMA system, a evolutional base station (Evolutional Node B, eNB or NodeB) in an LTE system, or a wireless controller in a cloud radio access network (CRAN), or the network device may be a mobile switching center, a relay station, a access point, a vehicle-mounted device, a wearable device, a hub, a switch, a bridge, a router, a network side device in a 5G network or network device in a future evolutional public land mobile network (PLMN), etc.

The communicating system 100 also includes at least one terminal device 120 located within the coverage area of the network device 110. The "terminal equipment" used here includes but is not limited to the devices connection via wired lines, such as connection via public switched telephone networks (PSTN), a digital subscriber line (DSL), a digital cable and direct cable; and/or via another data connection/network; and/or via a wireless interface, such as a cellular network, a wireless local area network (WLAN), a digital television network such as a DVB-H network, a satellite network, a AM-FM broadcast transmitter; and/or another terminal device which is configured to receive/transmit communication signals; and/or internet of things (IOT) devices. A terminal device configured to communicate through a wireless interface may be called a "wireless communication terminal", a "wireless terminal" or a "mobile terminal". Examples of mobile terminals include but are not limited to a satellite or a cellular call; a personal communications system (PCS) terminal which can combine cellular radio telephone with data processing, fax and data communication capabilities; a personal digital assistant (PDA) that may include radio telephones, pagers, internet/intranet access, Web browsers, notebooks, calendars, and/or global positioning system (GPS) receivers; as well as conventional laptop and/or palmtop receivers or other electronic devices including radio telephone transceivers. Terminal devices may refer to an access terminal, a user equipment (UE), a subscriber unit, a subscriber station, a mobile stations, a mobile carriage, a remote station, a remote terminal, a mobile device, a user terminal, a terminal, a wireless communicating device, a user agent or a user device. The access terminal may be cellular phone, a cordless phone, a session initiation protocol (SIP) phone, a wireless local loop (WLL) station, a PDA, a handheld device with wireless communication capability, a computing device or other processing devices connected to a wireless modem, vehicle-mounted device, wearable device, terminal device in 5G network or terminal device in future evolutional PLMN, etc.

In an embodiment, a device to device (D2D) communication may be performed between the terminal devices 120.

In an embodiment, the 5G system or 5G network can also be called a new radio (NR) system or NR network.

FIG. 3 shows one network device and two terminal devices exemplarily. In an embodiment, the communicating system 100 may include a plurality of network devices and the coverage area of each network device may include other number of terminal devices, which is not limited in the embodiment of the present application.

In an embodiment, the communicating system 100 may also include other network entities such as a network controller, a mobility management entity and so on, which is not limited in the embodiment of the present application.

It should be understood that devices with communication capacities in the network/system in the embodiments of the present application may be called communicating devices. Taking the communicating system 100 shown in FIG. 3 as an example, the communicating devices may include a network device 110 and a terminal device 120 with communication capacities, which may be the specific devices described above, and will not be described in detail here; communicating devices may also include other devices in the communicating system 100, such as network controllers, mobility management entities and other network entities, which are not limited in the embodiments of the present application.

As shown in FIG. 4, the optional processing flow of the information processing method for the terminal device provided by an embodiment of the present application includes the following steps:

S201, a terminal device detects a SSB and detects a PDCCH of the RMSI within a CORESET of the RMSI associated with the SSB.

In an embodiment of the present application, information about a time domain candidate position of the CORESET of the RMSI associated with the SSB is determined based on a time domain parameter impact factor of the SSB.

Where the time domain parameter impact factors include:

a time offset of a starting position of a half frame where the SSB is located relative to a nearest even system frame boundary before a time domain position where the SSB is located; and/or, an offset factor between a first candidate transmitting position of the SSB and a second candidate transmitting position of the SSB.

In some optional embodiments, when the time domain parameter impact factor is the time offset of the start position of the half frame where the SSB is located relative to the nearest even system frame boundary before the time domain position where the SSB is located, an offset which is represented by (T'·2") is added based on the formulas for calculating the frame number position and the time slot position in the information about the time domain candidate position of the CORESET of the RMSI associated with the SSB in related technologies, and the offset is the time offset of the start position of the half frame where the SSB is located relative to the nearest even system frame boundary before the time domain position where the SSB is located.

Therefore, the frame number position in the information about the time domain candidate position of the CORESET of the RMSI associated with the SSB satisfies:

$SFN_C \bmod 2 = 0$ when $$\lfloor (T \cdot 2^\mu + O \cdot 2^\mu + \lfloor i \cdot M \rfloor) / N_{slot}^{frame,\mu} \rfloor \bmod 2 = 0,$$

or $SFN_C \bmod 2 = 1$ when $$\lfloor (T \cdot 2^\mu + O \cdot 2^\mu + \lfloor i \cdot M \rfloor) / N_{slot}^{frame,\mu} \rfloor \bmod 2 = 1,$$

the time slot position in the information about the time domain candidate position of the CORESET of the RMSI associated with the SSB is: a K-th time slot starting from a $n_0$-th slot;

where $$n_0 = (T \cdot 2^\mu + O \cdot 2^\mu + \lfloor i \cdot M \rfloor) \bmod N_{slot}^{frame,\mu}.$$

Where T is the time offset of the start position of the half-frame where the SSB is located relative to the nearest even system frame boundary before the time domain position where the SSB is located, i is an index number of the SSB, M is a second parameter configured by the system, K is a preset value, µ represents different subcarrier spacings of the slot CORESET of the RMSI, $N_{slot}^{frame,\mu}$ is the number of a time slot in a system frame, and O is a first parameter configured by the system, O=0, 2, 5, 7, or O=1, 2.5, 6, 7.5.

In some embodiments, the correspondence relationship between µ and the subcarrier spacing is shown in table 1 below: when µ is 0, the corresponding subcarrier spacing is 15 kHz, and when u is 1, the corresponding subcarrier spacing is 30 kHz.

TABLE 1

| μ | subcarrier spacing (kHz) |
|---|---|
| 0 | 15 |
| 1 | 30 |
| 2 | 60 |
| 3 | 120 |
| 4 | 240 |

For example, when the network device transmits a SSB burst set in the first half of an odd frame, under the subcarrier spacing of 30 kHz (μ=1), T is the time offset (10 ms) of the half frame where the SSB is located relative to the even system frame boundary, O is 5 ms configured by the system, i is the SSB index (i=1), M is configured by the system M=1, $N_{slot}^{frame,\mu}$ is the number of the time slot in a system frame (it equals 20 when the subcarrier slot spacing is 30 kHz), and K is predefined as 2. Under the above parameter configuration, for the first SSB, the terminal device detects the CORESET of the RMSI associated with the first SSB at two time slots starting from the $n_0$=11-th time slot when the system frame number satisfies $SFN_C$(mod 2=1. A diagram of the SSB and the CORESET of the RMSI associated with the SSB is shown in FIG. 5.

In other optional embodiments, when the time domain parameter impact factor is the offset factor of the first candidate transmitting position of the SSB and the second candidate transmitting position of the SSB, a time domain offset impact factor is added based on the formulas for calculating the frame number position and the time slot position in the information about the time domain candidate position of the CORESET of the RMSI associated with the SSB in related technologies. For example, when the network device delays to transmit a SSB i at a i+$t_{off\_SSB}$-th candidate transmitting position due to a failure of LBT when transmitting the SSB i at a i-th transmitting position, a parameter $t_{off\_RMSI}$ associated with the delayed transmitting position $t_{off\_SSB}$ of the SSB i is newly added to the relevant formula for calculating the time slot position of the CORESET of the RMSI; it may be understood that the time domain position of the CORESET of the RMSI associated with the i-th SSB is also delayed to the i+$t_{off\_RMS}$-th candidate time domain position of the CORESET of the RMSI. Therefore, when $t_{off\_SSB}$ is L, $t_{off\_RMSI}$ also takes L.

Therefore, the frame number position in the information about the time domain candidate position of the CORESET of the RMSI associated with the SSB satisfies:

$SFN_C$ mod 2=0 when $$\lfloor (O \cdot 2^\mu + \lfloor (i + t_{off\_RMSI}) \cdot M \rfloor) / N_{slot}^{frame,\mu} \rfloor \mod 2 = 0,$$

or $SFN_C$ mod 2=1 when $$\lfloor (O \cdot 2^\mu + \lfloor (i + t_{off\_RMSI}) \cdot M \rfloor) / N_{slot}^{frame,\mu} \rfloor \mod 2 = 1,$$

the time slot position in the information about the time domain candidate position of the CORESET of the RMSI associated with the SSB is: the K-th time slot starting from the $n_0$-th slot;

where $$n_0 = (O \cdot 2^\mu + \lfloor (i + t_{off\_RMSI}) \cdot M \rfloor) \mod N_{slot}^{frame,\mu}.$$

Where i is the index number of the SSB, M is the second parameter configured by the system, $N_{slot}^{frame,\mu}$ is the number of the slot in a system frame (the value corresponding to the subcarrier spacing μ), K is a predefined value, as shown in Table 1 above, μ represents different subcarrier spacings of the CORESET of the RMSI. O is the first parameter configured by the system configuration, O=0, 2, 5, 7 or O=1, 2.5, 6, 7.5.

Herein, a SSB i cannot be transmitted at the i-th transmitting position due to the failure of the LBT when the SSB i is transmitted at the i-th transmitting position, the i-th transmitting position is the first candidate transmitting position at this time, that is the candidate transmitting position before the SSB i being transmitted with delay. The i+$t_{off\_RMSI}$-th transmitting position is the second candidate transmitting position, that is, the actual candidate transmitting position of the SSB i when the SSB i is transmitted at the i+$t_{off\_RMSI}$-th transmitting position.

Herein, the i+$t_{off\_RMSI}$-th candidate transmitting position is still the candidate transmitting position of the i-th SSB.

In yet another embodiments, when the network device delays to transmit a SSB i at a i'-th candidate transmitting position due to a failure of LBT when transmitting the SSB i at a i-th transmitting position, a parameter i' associated with the delayed transmitting position of the SSB i is newly added to the relevant formula for calculating the time domain slot position of the CORESET of the RMSI, at this time, the time domain position of the CORESET of the RMSI associated with the i-th SSB is also delayed to an i'-th candidate time domain position of the CORESET of the RMSI.

Therefore, the frame number position in the information about the time domain candidate position of the CORESET of the RMSI associated with the SSB satisfies:

$SFN_C$ mod 2=0 when $$\lfloor (O \cdot 2^\mu + \lfloor (i') \cdot M \rfloor) / N_{slot}^{frame,\mu} \rfloor \mod 2 = 0,$$

or $SFN_C$ mod 2=1 when $$\lfloor (O \cdot 2^\mu + \lfloor (i') \cdot M \rfloor) / N_{slot}^{frame,\mu} \rfloor \mod 2 = 1,$$

the time slot position in the information about the time domain candidate position of the CORESET of the RMSI associated with the SSB is: the K-th time slot starting from the $n_0$-th slot;

where $$n_0 = (O \cdot 2^\mu + \lfloor (i') \cdot M \rfloor) \mod N_{slot}^{frame,\mu}.$$

Where i' represents that the actual transmitting position of the SSB i located at the i'-th candidate transmitting position of the SSB, M is the second parameter configured by the system, $N_{slot}^{frame,\mu}$ is the number of slot in a system frame (the value corresponding to the subcarrier spacing μ), K is a predefined value, as shown in Table 1 above, μ represents different subcarrier spacings of the CORESET of the RMSI. O is the first parameter configured by the system, O=0, 2, 5, 7 or O=1, 2.5, 6, 7.5.

Herein, the i'-th candidate transmitting position after the delayed transmission of the i-th SSB is the identified candidate transmitting position of the i'-th SSB.

In some embodiments, when the time domain parameter impact factor is the time offset of the start position of the half frame where the SSB is located relative to the nearest even system frame boundary before the time domain position where the SSB is located, and when the time domain parameter impact factor is the offset factor of the first candidate transmitting position of the SSB and the second candidate transmitting position of the SSB, the aforementioned impact factors of the time domain offset are added based on both the formulas for calculating the frame number position and time slot position in the information about the time domain candidate position of the CORESET of the RMSI associated with the SSB in related technologies. For example, when the network device delays to transmit a SSB i at a i+$t_{off\_SSB}$-th candidate transmitting position due to a failure of LBT when transmitting the SSB i at a i-th transmitting position, a parameter $t_{off\_RMSI}$ associated with the delayed transmitting position $t_{off\_SSB}$ of the SSB i is newly added to the relevant formula for calculating the time slot position of the CORESET of the RMSI; it may be understood that the time domain position of the CORESET of the RMSI associated with the i-th SSB is also delayed to the i+$t_{off\_RMS}$-th candidate time domain position of the CORESET of the RMSI. Therefore, when $t_{off\_SSB}$ is L, $t_{off\_RMSI}$ also takes L.

Therefore, the frame number position in the information about the time domain candidate position of the CORESET of the RMSI associated with the SSB satisfies:

$SFN_C$ mod 2=0 when $$\lfloor (T \cdot 2^\mu + O \cdot 2^\mu + \lfloor (i + t_{off\_RMSI}) \cdot M \rfloor) / N_{slot}^{frame,\mu} \rfloor \mod 2 = 0,$$

or $SFN_C$ mod 2=1 when $$\lfloor (T \cdot 2^\mu + O \cdot 2^\mu + \lfloor (i + t_{off\_RMSI}) \cdot M \rfloor) / N_{slot}^{frame,\mu} \rfloor \mod 2 = 1,$$

the time slot position in the information about the time domain candidate position of the CORESET of the RMSI associated with the SSB is: the K-th time slot starting from the $n_0$-th slot;
where $$n_0 = (T \cdot 2^\mu + O \cdot 2^\mu + \lfloor (i + t_{off\_RMSI}) \cdot M \rfloor) / N_{slot}^{frame,\mu}.$$

Where T is the time offset of the half frame where the SSB is located relative to the even system frame boundary, i is the index number of the SSB, M is the second parameter configured by the system, K is the preset value, μ represents different subcarrier spacings of the CORESET of the RMSI, and $t_{off\_RMSI}$ is the offset factor of the first candidate transmitting position before the SSB delayed transmission and the second candidate transmitting position after the SSB delayed transmission. O is the first parameter configured by the system, O=0, 2, 5, 7 or O=1, 2.5, 6, 7.5.

In the embodiments of the present application, by adding a parameter information (such as $t_{off\_RMSI}$) associated with the delayed transmitting position of the SSB i in the relevant formula for calculating the time domain time slot position of the CORESET of the RMSI; in addition, the i-th time domain position of the CORESET of the RMSI associated with the SSB is delayed to the i+$t_{off\_RMSI}$-th candidate time domain position of the CORESET of the RMSI, the time domain transmitting position of the CORESET of the RMSI associated with the SSB i falls outside the available channel successfully preempted by network device is avoided.

In some embodiments, when the time domain parameter impact factor is the time offset of the start position of the half frame where the SSB is located relative to the nearest even system frame boundary before the time domain position where the SSB is located, and when the time domain parameter impact factor is the offset factor of the first candidate transmitting position of the SSB and the second candidate transmitting position of the SSB, the aforementioned impact factors of the time domain offset are added based on both the formulas for calculating the frame number position and time slot position in the information about the time domain candidate position of the CORESET of the RMSI associated with the SSB in related technologies. For example, when the network device delays to transmit a SSB i at a i'-th candidate transmitting position due to a failure of LBT when transmitting the SSB i at a i-th transmitting position, a parameter i' associated with the delayed transmitting position of the SSB i is newly added to the relevant formula for calculating the time domain slot position of the CORESET of the RMSI.

Therefore, the frame number position in the information about the time domain candidate position of the CORESET of the RMSI associated with the SSB is K time slot starting from the $n_0$=(T·$2^\mu$+O·$2^\mu$+⌊(i')·M⌋)mod $N_{slot}^{frame,\mu}$-th time slot for which a system frame number satisfies:

$SFN_C$ mod 2=0 when $$\lfloor (T \cdot 2^\mu + O \cdot 2^\mu + \lfloor (i') \cdot M \rfloor) / N_{slot}^{frame,\mu} \rfloor \mod 2 = 0,$$

or $SFN_C$ mod 2=1 when $$\lfloor (T \cdot 2^\mu + O \cdot 2^\mu + \lfloor (i') \cdot M \rfloor) / N_{slot}^{frame,\mu} \rfloor \mod 2 = 1,$$

where T is the time offset of the start position of the half frame where the SSB is located relative to the nearest even system frame boundary before the time domain position where the SSB is located, i' is the index number of the candidate transmitting position of the SSB, M is the second parameter configured by the system, K is the preset value, μ represents different subcarrier spacings of the CORESET of the RMSI, and $N_{slot}^{frame,\mu}$ is the number of the time slot in a system frame. O is the first parameter configured by the system, O=0, 2, 5, 7 or O=1, 2.5, 6, 7.5.

As shown in FIG. 6, the optional processing flow of the information processing method applied to the network device provided by an embodiment of the present application includes the following steps:

S301: the network device determines information about a time domain candidate position of a SSB and information about a time domain candidate position of a CORESET of the RMSI associated with the SSB, so that the SSB and a physical downlink control channel PDCCH of the RMSI in the CORESET of the RMSI associated with the SSB are transmitted within one time domain interval.

In an embodiment of the present application, the information about a time domain candidate position of the CORESET of the RMSI associated with the SSB is determined based on a time domain parameter impact factor of the SSB.

Herein, the specific description of determining the information about the time domain candidate position of the SSB and information about the time domain candidate position of the CORESET of the RMSI associated with the SSB is the same as that in step S201, and will not be repeated herein.

An embodiment of the present application further provides a terminal device, as shown in FIG. 7, the composition structure of the terminal device 400 includes:

a detecting unit 401, configured to detect a SSB and detect a PDCCH of the RMSI within a CORESET of the RMSI associated with the SSB; the information about a time domain candidate position of the CORESET of the RMSI associated with the SSB is determined based on a time domain parameter impact factor of the SSB.

In an embodiment of the present application, the time domain parameter impact factor includes:

a time offset of a starting position of a half frame where the SSB is located relative to a nearest even system frame boundary before a time domain position where the SSB is located; and/or, an offset factor between a first candidate transmitting position of the SSB and a second candidate transmitting position of the SSB.

The information about the time domain candidate position of the CORESET of the RMSI associated with the SSB is obtained by calculating based on that a starting position of a half frame of the time domain position where the SSB is located is taken as a starting position;

and/or, is calculated by taking a sum of an index value of the SSB and the offset factor between a first candidate transmitting position before the SSB is transmitted with delay and a second candidate transmitting position after the SSB is transmitted with delay, as a new index value of the SSB.

In an embodiment of the present application, the information about the time domain candidate position of the CORESET of the RMSI associated with the SSB is a K-th time slot starting from a $n_0 = (T \cdot 2^\mu + O \cdot 2^\mu + \lfloor i \cdot M \rfloor) \bmod N_{slot}^{frame,\mu}$-th time slot for which:

a system frame number satisfies:

$$\lfloor (T \cdot 2^\mu + O \cdot 2^\mu + \lfloor i \cdot M \rfloor) / N_{slot}^{frame,\mu} \rfloor \bmod 2 = 0,$$

$SFN_C \bmod 2 = 0$ when $$\lfloor (T \cdot 2^\mu + O \cdot 2^\mu + \lfloor i \cdot M \rfloor) / N_{slot}^{frame,\mu} \rfloor \bmod 2 = 1,$$

or, $SFN_C \bmod 2 = 1$ when
where T is the time offset of the start position of the half frame where the SSB is located relative to the nearest even system frame boundary before the time domain position where the SSB is located, i is an index number of the SSB, M and O are configuration values, K is a preset value, μ represents different subcarrier spacings of the CORESET of the RMSI, slot and $N_{slot}^{frame,\mu}$ is a number of a time slot in a system frame.

In an embodiment of the present application, the information about the time domain candidate position of the CORESET of the RMSI associated with the SSB is K time slot starting from a $n_0 = (O \cdot 2^\mu + \lfloor (i + off\_RMSI) \cdot M \rfloor) \bmod N_{slot}^{frame,\mu}$-th time slot for which:

a system frame number satisfies:

$$\lfloor (O \cdot 2^\mu + \lfloor (i + t_{off\_RMSI}) \cdot M \rfloor) / N_{slot}^{frame,\mu} \rfloor \bmod 2 = 0,$$

$SFN_C \bmod 2 = 0$ when $$\lfloor (O \cdot 2^\mu + \lfloor (i + t_{off\_RMSI}) \cdot M \rfloor) / N_{slot}^{frame,\mu} \rfloor \bmod 2 = 1,$$

or $SFN_C \bmod 2 = 1$ when
where i is an index number of the SSB, $t_{off\_RMSI}$ is the offset factor between the first candidate transmitting position of the SSB and the second candidate transmitting position of the SSB, M and O are configuration values, K is a preset value, μ represents different subcarrier spacings of the CORESET of the RMSI, and $N_{slot}^{frame,\mu}$ is a number of a time slot in a system frame.

In an embodiment of the present application, the information about the time domain candidate position of the CORESET of the RMSI associated with the SSB is K time slot starting from a $n_0 = (T \cdot 2^\mu + O \cdot 2^\mu + \lfloor (i + t_{off\_RMSI}) \cdot M \rfloor) \bmod N_{slot}^{frame,\mu}$-th time slot for which:

a system frame number satisfies:

$$\lfloor (T \cdot 2^\mu + O \cdot 2^\mu + \lfloor (i + t_{off\_RMSI}) \cdot M \rfloor) / N_{slot}^{frame,\mu} \rfloor \bmod 2 = 0,$$

$SFN_C \bmod 2 = 0$ when $$\lfloor (T \cdot 2^\mu + O \cdot 2^\mu + \lfloor (i + t_{off\_RMSI}) \cdot M \rfloor) / N_{slot}^{frame,\mu} \rfloor \bmod 2 = 1,$$

or $SFN_C \bmod 2 = 1$ when
where T is the time offset of the start position of the half frame where the SSB is located relative to the nearest even system frame boundary before the time domain position where the SSB is located, i is an index number of the SSB, $t_{off\_RMSI}$ is the offset factor between the first candidate transmitting position of the SSB and the second candidate transmitting position of the SSB, M and O are configuration values, K is a preset value, μ slot represents different subcarrier spacings of the CORESET of the RMSI, and $N_{slot}^{frame,\mu}$ is a number of a time slot in a system frame.

In the embodiment of the present application, $t_{off\_RMSI}$ is a maximum number of the SSB transmitted in a first time interval under a current frequency band.

In an embodiment of the present application, when the SSB is an SSB with an index number i and the second candidate transmitting position of the SSB with the index number i is a candidate transmitting position of the i'-th SSB, the information about the time domain candidate position of the CORESET of the RMSI associated with the SSB is K time slot starting from a $n_0 = (O \cdot 2^\mu + \lfloor (i') \cdot M \rfloor) \bmod N_{slot}^{frame,\mu}$-th time slot for which:

a system frame number satisfies:

SFN$_C$ mod 2=0 when $$\lfloor (O \cdot 2^\mu + \lfloor (i') \cdot M \rfloor) / N_{slot}^{frame,\mu} \rfloor \bmod 2 = 0,$$

or SFN$_C$ mod 2=1 when $$\lfloor (O \cdot 2^\mu + \lfloor (i') \cdot M \rfloor) / N_{slot}^{frame,\mu} \rfloor \bmod 2 = 1,$$

where i' is an index number of the candidate transmitting position of the SSB, M and O are configuration values, K is a preset value, µ represents different subcarrier spacings of the CORESET of the RMSI, and $N_{slot}^{frame,\mu}$ is a number of a time slot in a system frame.

In an embodiment of the present application, when the SSB is a SSB with an index number i and the second candidate transmitting position of the SSB with the index number i is a candidate transmitting position of the i'-th SSB, the information about the time domain candidate position of the CORESET of the RMSI associated with the SSB is K time slot starting from a $n_0 = (T \cdot 2^\mu + O \cdot 2^\mu + \lfloor (i') \cdot M \rfloor) \bmod N_{slot}^{frame,\mu}$-th time slot for which a system frame number satisfies:

SFN$_C$ mod 2=0 when $$\lfloor (T \cdot 2^\mu + O \cdot 2^\mu + \lfloor (i') \cdot M \rfloor) / N_{slot}^{frame,\mu} \rfloor \bmod 2 = 0,$$

or SFN$_C$ mod 2=1 when $$\lfloor (T \cdot 2^\mu + O \cdot 2^\mu + \lfloor (i') \cdot M \rfloor) / N_{slot}^{frame,\mu} \rfloor \bmod 2 = 1,$$

where T is the time offset of the start position of the half frame where the SSB is located relative to the nearest even system frame boundary before the time domain position where the SSB is located, i' is an index number of the candidate transmitting position of the SSB, M and O are configuration values, K is a preset value, µ represents different subcarrier slot spacings of the CORESET of the RMSI, and $N_{slot}^{frame,\mu}$ is a number of a time slot in a system frame.

In the embodiment of the present application, the first candidate transmitting position is a candidate transmitting position before the SSB is transmitted with delay;

the second candidate transmitting position is an actual candidate transmitting position of the SSB.

In an embodiment of the present application, O=0, 2, 5, 7 or O=1, 2.5, 6, 7.5.

Figure 8:
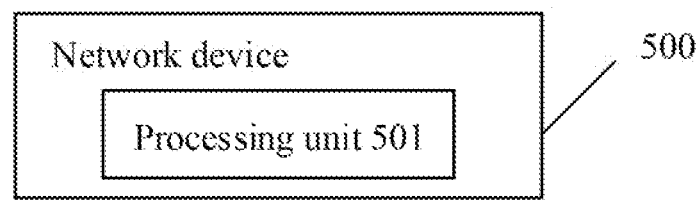
FIG. 8 is a schematic diagram of the composition and structure of network device provided by an embodiment of the present application.

An embodiment of the present application further provides a network device, and as shown in FIG. 8, a schematic structural diagram of the network device 500 includes:

a processing unit 501, configured to determine information about a time domain candidate position of a SSB and information about a time domain candidate position of a CORESET of the RMSI associated with the SSB, so that the SSB and a PDCCH of the RMSI in the CORESET of the RMSI associated with the SSB are transmitted within one time domain interval; the information about a time domain candidate position of the CORESET of the RMSI associated with the SSB is determined based on a time domain parameter impact factor of the SSB.

In the above solution, the time domain parameter influence factors include: a time offset of a starting position of a half frame where the SSB is located relative to a nearest even system frame boundary before a time domain position where the SSB is located; and/or, an offset factor between a first candidate transmitting position of the SSB and a second candidate transmitting position of the SSB.

In the above solution, the processing unit 501 is configured to obtain the information about the time domain candidate position of the CORESET of the RMSI associated with the SSB by calculating based on that a starting position of a half frame of the time domain position where the SSB is located is taken as a starting position; and/or the processing unit 501 is configured to calculate and obtain the information about the time domain candidate position of the CORESET of the RMSI associated with the SSB by taking a sum of an index value of the SSB and the offset factor between a first candidate transmitting position before the SSB is transmitted with delay and a second candidate transmitting position after the SSB is transmitted with delay, as a new index value of the SSB.

In the above solution, the processing unit 501 is configured to determine the K-th time slot starting from a $n_0 = (T \cdot 2^\mu + O \cdot 2^\mu + \lfloor i \cdot M \rfloor) \bmod N_{slot}^{frame,\mu}$-th time slot for which a system frame number satisfy:

SFN$_C$ mod 2=0 when $$\lfloor (T \cdot 2^\mu + O \cdot 2^\mu + \lfloor i \cdot M \rfloor) / N_{slot}^{frame,\mu} \rfloor \bmod 2 = 0,$$

or SFN$_C$ mod 2=1 when $$\lfloor (T \cdot 2^\mu + O \cdot 2^\mu + \lfloor i \cdot M \rfloor) / N_{slot}^{frame,\mu} \rfloor \bmod 2 = 1,$$

as the information about the time domain candidate position of the CORESET of the RMSI associated with the SSB;

where T is the time offset of the start position of the half frame where the SSB is located relative to the nearest even system frame boundary before the time domain position where the SSB is located, i is an index number of the SSB, M and O are configuration values, K is a preset value, µ represents different subcarrier spacings of the CORESET of the RMSI, slot and $N_{slot}^{frame,\mu}$ is a number of a time slot in a system frame.

In the above solution, the processing unit 501 is configured to determine K time slot starting from a $n_0 = (O \cdot 2^\mu + \lfloor (i + t_{off\_RMSI}) \cdot M \rfloor) \bmod N_{slot}^{frame,\mu}$-th time slot for which a system frame number satisfy:

SFN$_C$ mod 2=0 when, $$\lfloor (O \cdot 2^\mu + \lfloor (i + t_{off\_RMSI}) \cdot M \rfloor) / N_{slot}^{frame,\mu} \rfloor \bmod 2 = 0$$

or SFN$_C$ mod 2=1 when $$\lfloor (O \cdot 2^\mu + \lfloor (i + t_{off\_RMSI}) \cdot M \rfloor) / N_{slot}^{frame,\mu} \rfloor \bmod 2 = 1,$$

as the information about the time domain candidate position of the CORESET of the RMSI associated with the SSB;

where i is an index number of the SSB, $t_{off\_RMSI}$ is the offset factor between the first candidate transmitting position of the SSB and the second candidate transmitting position of the SSB, M and O are configuration values, K is a preset value, μ represents different subcarrier spacings of the CORESET of the RMSI, and slot is a number of a $N_{slot}^{frame,\mu}$ time slot in a system frame.

In the above solution, the processing unit 501 is configured to determine K time slot starting from the $n_0 = (T \cdot 2^\mu + O \cdot 2^\mu + \lfloor (i + t_{off\_RMSI}) \cdot M \rfloor) \bmod N_{slot}^{frame,\mu}$-th time slot for which a system frame number satisfy:

$SFN_C \bmod 2 = 0$ when $$\lfloor (T \cdot 2^\mu + O \cdot 2^\mu + \lfloor (i + t_{off\_RMSI}) \cdot M \rfloor) / N_{slot}^{frame,\mu} \rfloor \bmod 2 = 0,$$

or $SFN_C \bmod 2 = 1$ when $$\lfloor (T \cdot 2^\mu + O \cdot 2^\mu + \lfloor (i + t_{off\_RMSI}) \cdot M \rfloor) / N_{slot}^{frame,\mu} \rfloor \bmod 2 = 1,$$

as the information about the time domain candidate position of the CORESET of the RMSI associated with the SSB;

where T is the time offset of the start position of the half frame where the SSB is located relative to the nearest even system frame boundary before the time domain position where the SSB is located, i is an index number of the SSB, $t_{off\_RMSI}$ is the offset factor between the first candidate transmitting position of the SSB and the second candidate transmitting position of the SSB, M and O are configuration values, K is a preset value, μ represents different subcarrier spacings of the CORESET of the RMSI, and $N_{slot}^{frame,\mu}$ is a number of a time slot in a system frame.

In the above solution, $t_{off\_RMSI}$ is a maximum number of the SSB transmitted in a first time interval under a current frequency band.

In the above solution, when the SSB is a SSB with an index number i and the second candidate transmitting position of the SSB with the index number i is a candidate transmitting position of the i'-th SSB, the processing unit 501 is configured to determine K time slot starting from a $n_0 = (O \cdot 2^\mu + \lfloor (i') \cdot M \rfloor) \bmod N_{slot}^{frame,\mu}$-th time slot for which a system frame number satisfy:

$SFN_C \bmod 2 = 0$ when $$\lfloor (O \cdot 2^\mu + \lfloor (i') \cdot M \rfloor) / N_{slot}^{frame,\mu} \rfloor \bmod 2 = 0,$$

or $SFN_C \bmod 2 = 1$ when $$\lfloor (O \cdot 2^\mu + \lfloor (i') \cdot M \rfloor) / N_{slot}^{frame,\mu} \rfloor \bmod 2 = 1,$$

as the information about the time domain candidate position of the CORESET of the RMSI associated with the SSB;

where i' is an index number of the candidate transmitting position of the SSB, M and O are configuration values, K is a preset value, μ represents different subcarrier spacings of the CORESET of the RMSI, and $N_{slot}^{frame,\mu}$ is a number of a time slot in a system frame.

In the above solution, when the SSB is a SSB with an index number i and the second candidate transmitting position of the SSB with the index number i is a candidate transmitting position of the i'-th SSB, the processing unit 501 is configured to determine K time slot starting from a $n_0 = (T \cdot 2^\mu + O \cdot 2^\mu + \lfloor (i') \cdot M \rfloor) \bmod N_{slot}^{frame,\mu}$-th time slot for which a system frame number satisfy:

$SFN_C \bmod 2 = 0$ when $$\lfloor (T \cdot 2^\mu + O \cdot 2^\mu + \lfloor (i') \cdot M \rfloor) / N_{slot}^{frame,\mu} \rfloor \bmod 2 = 0,$$

or $SFN_C \bmod 2 = 1$ when $$\lfloor (T \cdot 2^\mu + O \cdot 2^\mu + \lfloor (i') \cdot M \rfloor) / N_{slot}^{frame,\mu} \rfloor \bmod 2 = 1,$$

as the information about the time domain candidate position of the CORESET of the RMSI associated with the SSB;

where T is the time offset of the start position of the half frame where the SSB is located relative to the nearest even system frame boundary before the time domain position where the SSB is located, i' is an index number of the candidate transmitting position of the SSB, M and O are configuration values, K is a preset value, μ represents different subcarrier spacings of the CORESET of the RMSI, and $N_{slot}^{frame,\mu}$ is a number of a time slot in a system frame.

In the above solution, the first candidate transmitting position is a candidate transmitting position before the SSB is transmitted with delay; and the second candidate transmitting position is an actual candidate transmitting position of the SSB.

In the above solution, a configuration value of O comprises 1, 2.5, 6 and 7.5.

The embodiment of the present application also provides a terminal device, which includes a processor and a memory for storing a computer program capable of running on the processor, where the processor executes the steps of the power allocation method executed by the terminal device when running the computer program.

The embodiment of the present application also provides a network device, which includes a processor and a memory for storing a computer program capable of running on the processor, where the processor executes the steps of the power allocation method executed by the network device when running the computer program.

Figure 9:
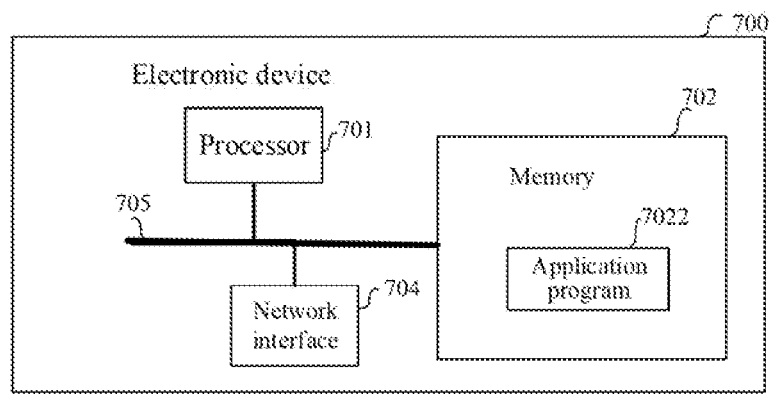
FIG. 9 is a schematic diagram of the hardware composition and structure of the electronic device provided by an embodiment of the present application.

FIG. 9 is a schematic diagram of the hardware structure of an electronic device (network device or terminal device) according to an embodiment of the present application. The electronic device 700 includes at least one processor 701, a memory 702 and at least one network interface 704. The components in the electronic device 700 are coupled together by a bus system 705. It may be understood that the bus system 705 is configured to implement the connection communication between these components. The bus system 705 includes a power bus, a control bus and a status signal bus in addition to a data bus. However, various buses are labeled as bus system 705 in FIG. 9 for clarity of illustration.

It can be understood that the memory 702 may be a volatile memory or a non-volatile memory, and may also include both of a volatile and a non-volatile memory. Where the non-volatile memory may be a ROM, a programmable read-only memory (PROM), a erasable programmable read-only memory (EPROM), an electrically erasable programmable read-only memory (EEPROM), a ferromagnetic random access memory (FRAM), a flash memory, a magnetic surface memory, an optical disc, or a compact disc read-only memory (CD-ROM); the magnetic surface memory may be a magnetic disk memory or a magnetic tape memory. The volatile memory may be a random access memory (RAM), which is used as an external cache. By way of example but not limitation, many forms of RAM are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 702 described in embodiments of the present application is intended to include, but is not limited to, these and any other suitable types of memory.

The memory 702 in the embodiment of the present application is configured to store various types of data to support the operation of the electronic device 700. Examples of such data include any computer program for operating on the electronic device 700, such as the application program 7022. A program for implementing the method of an embodiment of the present application may be included in the application program 7022.

The method disclosed in the above embodiment of the present application may be applied to the processor 701 or implemented by the processor 701. The processor 701 may be an integrated circuit chip with signal processing capability. Each step of the above method may be completed by an integrated logic circuit of hardware or instructions in the form of software in the processor 701 in the implementation process. The above-mentioned processor 701 may be a general-purpose processor, a digital signal processor (DSP), or other programmable logic devices, discrete gate or transistor logic devices, discrete hardware components, etc. The processor 701 can implement or execute the disclosed methods, steps and logic block diagrams in embodiments of the present application. The general-purpose processor may be a microprocessor or any conventional processor. The steps of the method disclosed in connection with the embodiment of the present application may be directly embodied as the completion of the hardware decoding processor or the combination of hardware and software modules in the decoding processor. The software module may be located in the storage medium which is located in the memory 702. The processor 701 reads information in the memory 702 and completes the steps of the aforementioned method in combination with its hardware.

In an exemplary embodiment, the electronic device 700 may be implemented by one or more application specific integrated circuit (ASIC), DSP, programmable logic device (PLD), complex programmable logic device (CPLD), FPGA, general-purpose processor, controller, MCU, MPU, or other electronic components for performing the aforementioned methods.

The embodiment of the application also provides a computer readable storage medium for storing a computer program.

In an embodiment, the computer-readable storage medium may be applied for the network device in the embodiment of the present application, and the computer program enables the computer to execute the corresponding flow implemented by the network device in each method of the embodiment of the present application, which will not be repeated here for brevity.

In an embodiment, the computer-readable storage medium may be applied for the terminal device in the embodiment of the present application, and the computer program enables the computer to execute the corresponding flow implemented by the terminal device in each method of the embodiment of the present application, which will not be repeated here for brevity.

The present application is described with reference to flowcharts and/or block diagrams of methods, devices (systems), and computer program products according to embodiments of the present application. It should be understood that each flow and/or block in the flowchart and/or block diagram, and combinations of flows and/or blocks in the flowchart and/or block diagram can be implemented by computer program instructions. These computer program instructions may be provided to a processor of a general purpose computer, a special purpose computer, an embedded processor or other programmable data processing device to produce a machine, which causes instructions executed by the processor of a computer or other programmable data processing devices to implement the functions specified in one or more flow diagrams and/or one or more block diagrams.

These computer program instructions may also be stored in a computer-readable memory that can direct a computer or other programmable data processing device to operate in a specific manner, such that the instructions stored in the computer-readable memory produce an article of manufacture including instruction devices which implement the functions specified in one or more flows of the flowchart and/or one or more blocks of the block diagram.

These computer program instructions may also be loaded onto a computer or other programmable data processing devices, such that a series of operational steps are performed on the computer or other programmable device to produce a computer-implemented process, such that the instructions which execute on the computer or other programmable device provide steps for implementing the functions specified in one or more flow diagrams and/or one or more block diagrams.

The above is only a preferred embodiment of the present application, and is not intended to limit the protection scope of the present application. Any modification, equivalent substitution and improvement made within the spirit and principle of the present application shall be included in the protection scope of the present application.

What is claimed is:

1. An information processing method, wherein the method comprises:
   detecting, by a terminal device, a synchronization signal block (SSB) and detecting a physical downlink control channel (PDCCH) of remaining minimum system information (RMSI) within a control resource set (CORESET) of the RMSI associated with the SSB;

wherein information about a time domain candidate position of the CORESET of the RMSI associated with the SSB is determined based on a time domain parameter impact factor of the SSB;

wherein the time domain parameter impact factor comprises at least one of:

a time offset of a starting position of a half frame where the SSB is located relative to a nearest even system frame boundary before a time domain position where the SSB is located; and an offset factor between a first candidate transmitting position of the SSB and a second candidate transmitting position of the SSB.

2. A terminal device, wherein the terminal device comprises a processor and a memory for storing a computer program capable of running on the processor, wherein, the processor is configured to detect a synchronization signal block (SSB) and detect a physical downlink control channel (PDCCH) of remaining minimum system information (RMSI) within a control resource set (CORESET) of the RMSI associated with the SSB;

wherein information about a time domain candidate position of the CORESET of the RMSI associated with the SSB is determined based on a time domain parameter impact factor of the SSB;

wherein the time domain parameter impact factor comprises at least one of:

a time offset of a starting position of a half frame where the SSB is located relative to a nearest even system frame boundary before a time domain position where the SSB is located; and an offset factor between a first candidate transmitting position of the SSB and a second candidate transmitting position of the SSB.

3. The terminal device according to claim 2, wherein the information about the time domain candidate position of the CORESET of the RMSI associated with the SSB is obtained by calculating based on that a starting position of a half frame of the time domain position where the SSB is located is taken as a starting position;

and/or, is calculated by taking a sum of an index value of the SSB and the offset factor between a first candidate transmitting position before the SSB is transmitted with delay and a second candidate transmitting position after the SSB is transmitted with delay, as a new index value of the SSB.

4. The terminal device according to claim 2, wherein the information about the time domain candidate position of the CORESET of the RMSI associated with the SSB is K time slot starting from a $n_0 = (T \cdot 2^\mu + O \cdot 2^\mu + \lfloor i \cdot M \rfloor) \bmod N_{slot}^{frame,\mu}$-th time slot for which a system frame number satisfies:

$SFN_C \bmod 2 = 0$ when $$\lfloor (T \cdot 2^\mu + O \cdot 2^\mu + \lfloor i \cdot M \rfloor) / N_{slot}^{frame,\mu} \rfloor \bmod 2 = 0, \text{ or,}$$

$SFN_C \bmod 2 = 1$ when $$\lfloor (T \cdot 2^\mu + O \cdot 2^\mu + \lfloor i \cdot M \rfloor) / N_{slot}^{frame,\mu} \rfloor \bmod 2 = 1,$$

wherein T is the time offset of the start position of the half frame where the SSB is located relative to the nearest even system frame boundary before the time domain position where the SSB is located, i is an index number of the SSB, M and O are configuration values, K is a preset value, μ represents different subcarrier spacings of the CORESET of the RMSI, and $N_{slot}^{frame,\mu}$ is a number of a time slot in a system frame.

5. The terminal device according to claim 4, wherein a configuration value of O comprises 1, 2.5, 6 and 7.5.

6. The terminal device according to claim 2, wherein the information about the time domain candidate position of the CORESET of the RMSI associated with the SSB is K time slot starting from a $n_0 = (O \cdot 2^\mu + \lfloor (i + t_{off\_RMSI}) \cdot M \rfloor) \bmod N_{slot}^{frame,\mu}$-th time slot for which a system frame number satisfies:

$SFN_C \bmod 2 = 0$ when $$\lfloor (O \cdot 2^\mu + \lfloor (i + t_{off\_RMSI}) \cdot M \rfloor) / N_{slot}^{frame,\mu} \rfloor \bmod 2 = 0,$$

or
$SFN_C \bmod 2 = 1$ when $$\lfloor (O \cdot 2^\mu + \lfloor (i + t_{off\_RMSI}) \cdot M \rfloor) / N_{slot}^{frame,\mu} \rfloor \bmod 2 = 1,$$

wherein i is an index number of the SSB, $t_{off\_RMSI}$ is the offset factor between the first candidate transmitting position of the SSB and the second candidate transmitting position of the SSB, M and O are configuration values, K is a preset value, μ represents different subcarrier spacings of the CORESET of the RMSI, and $N_{slot}^{frame,\mu}$ is a number of a time slot in a system frame.

7. The terminal device according to claim 6, wherein $t_{off\_RMSI}$ is a maximum number of the SSB transmitted in a first time interval under a current frequency band.

8. The terminal device according to claim 2, wherein the information about the time domain candidate position of the CORESET of the RMSI associated with the SSB is K time slot starting from a $n_0 = (T \cdot 2^\mu + O \cdot 2^\mu + \lfloor (i + t_{off\_RMSI}) \cdot M \rfloor) \bmod N_{slot}^{frame,\mu}$-th time slot for which a system frame number satisfies:

$SFN_C \bmod 2\text{-}0$ when $$\lfloor (T \cdot 2^\mu + O \cdot 2^\mu + \lfloor (i + t_{off\_RMSI}) \cdot M \rfloor) / N_{slot}^{frame,\mu} \rfloor \bmod 2 = 0,$$

or
$SFN_C \bmod 2 = 1$ when $$\lfloor (T \cdot 2^\mu + O \cdot 2^\mu + \lfloor (i + t_{off\_RMSI}) \cdot M \rfloor) / N_{slot}^{frame,\mu} \rfloor \bmod 2 = 1,$$

wherein T is the time offset of the start position of the half frame where the SSB is located relative to the nearest even system frame boundary before the time domain position where the SSB is located, i is an index number of the SSB, $t_{off\_RMSI}$ is the offset factor between the first candidate transmitting position of the SSB and the second candidate transmitting position of the SSB, M and O are configuration values, K is a preset value, μ represents different subcarrier spacings of the CORESET of the RMSI, and $N_{slot}^{frame,\mu}$ is a number of a time slot in a system frame.

9. The terminal device according to claim 2, wherein when the SSB is a SSB with an index number i and the second candidate transmitting position of the SSB with the index number i is a candidate transmitting position of the i'-th SSB, the information about the time domain candidate position of the CORESET of the RMSI associated with the SSB is K time slot starting from a $n_0=(O\cdot 2^\mu+\lfloor(i')\cdot M\rfloor)\bmod N_{slot}^{frame,\mu}$-th time slot for which a system frame number satisfies:

$SFN_C \bmod 2=0$ when $$\lfloor(O\cdot 2^\mu + \lfloor(i')\cdot M\rfloor)/N_{slot}^{frame,\mu}\rfloor \bmod 2 = 0,$$

or
$SFN_C \bmod 2=1$ when $$\lfloor(O\cdot 2^\mu + \lfloor(i')\cdot M\rfloor)/N_{slot}^{frame,\mu}\rfloor \bmod 2 = 1,$$

wherein i' is an index number of the candidate transmitting position of the SSB, M and O are configuration values, K is a preset value, μ represents different subcarrier spacings of the CORESET of the RMSI, and $N_{slot}^{frame,\mu}$ is a number of a time slot in a system frame.

10. The terminal device according to claim 2, wherein when the SSB is a SSB with an index number i and the second candidate transmitting position of the SSB with the index number i is a candidate transmitting position of the i'-th SSB, the information about the time domain candidate position of the CORESET of the RMSI associated with the SSB is K time slot starting from a $n_0=(T\cdot 2^\mu+O\cdot 2^\mu+\lfloor(i')\cdot M\rfloor)\bmod N_{slot}^{frame,\mu}$-th time slot for which a system frame number satisfies:

$SFN_C \bmod 2{-}0$ when or $$\lfloor(T\cdot 2^\mu + O\cdot 2^\mu + \lfloor(i')\cdot M\rfloor)/N_{slot}^{frame,\mu}\rfloor \bmod 2 = 0,$$

$SFN_C \bmod 2=1$ when $$\lfloor(T\cdot 2^\mu + O\cdot 2^\mu + \lfloor(i')\cdot M\rfloor)/N_{slot}^{frame,\mu}\rfloor \bmod 2 = 1,$$

wherein T is the time offset of the start position of the half frame where the SSB is located relative to the nearest even system frame boundary before the time domain position where the SSB is located, i' is an index number of the candidate transmitting position of the SSB, M and O are configuration values, K is a preset value, μ represents different subcarrier spacings of the CORESET of the RMSI, and $N_{slot}^{frame,\mu}$ is a number of a time slot in a system frame.

11. The terminal device according to claim 2, wherein the first candidate transmitting position is a candidate transmitting position before the SSB is transmitted with delay; and the second candidate transmitting position is an actual candidate transmitting position of the SSB.

12. A network device, wherein the network device comprises a processor and a memory for storing a computer program capable of running on the processor, wherein, the processor is configured to determine information about a time domain candidate position of a synchronization signal block (SSB) and information about a time domain candidate position of a control resource set (CORESET) of remaining minimum system information (RMSI) associated with the SSB, so that the SSB and a physical downlink control channel (PDCCH) of the RMSI in the CORESET of the RMSI associated with the SSB are transmitted within one time domain interval;

wherein the information about a time domain candidate position of the CORESET of the RMSI associated with the SSB is determined based on a time domain parameter impact factor of the SSB;

wherein the time domain parameter impact factor comprises at least one of:

a time offset of a starting position of a half frame where the SSB is located relative to a nearest even system frame boundary before a time domain position where the SSB is located; and an offset factor between a first candidate transmitting position of the SSB and a second candidate transmitting position of the SSB.

13. The network device according to claim 12, wherein the processor is configured to obtain the information about the time domain candidate position of the CORESET of the RMSI associated with the SSB by calculating based on that a starting position of a half frame of the time domain position where the SSB is located is taken as a starting position;

and/or the processor is configured to calculate and obtain the information about the time domain candidate position of the CORESET of the RMSI associated with the SSB by taking a sum of an index value of the SSB and the offset factor between a first candidate transmitting position before the SSB is transmitted with delay and a second candidate transmitting position after the SSB is transmitted with delay, as a new index value of the SSB.

14. The network device according to claim 12, wherein the processor is configured to determine K time slot starting from a $n_0=(T\cdot 2^\mu+O\cdot 2^\mu+\lfloor i\cdot M\rfloor)\bmod N_{slot}^{frame,\mu}$-th time slot for which a system frame number satisfy:

$SFN_C \bmod 2=0$ when $$\lfloor(T\cdot 2^\mu + O\cdot 2^\mu + \lfloor i\cdot M\rfloor)/N_{slot}^{frame,\mu}\rfloor \bmod 2 = 0,$$

or
$SFN_C \bmod 2=1$ when $$\lfloor(T\cdot 2^\mu + O\cdot 2^\mu + \lfloor i\cdot M\rfloor)/N_{slot}^{frame,\mu}\rfloor \bmod 2 = 1,$$

as the information about the time domain candidate position of the CORESET of the RMSI associated with the SSB;

wherein T is the time offset of the start position of the half frame where the SSB is located relative to the nearest even system frame boundary before the time domain position where the SSB is located, i is an index number of the SSB, M and O are configuration values, K is a preset value, μ represents different subcarrier spacings of the CORESET of the RMSI, and $N_{slot}^{frame,\mu}$ is a number of a time slot in a system frame.

15. The network device according to claim 12, wherein the processor is configured to determine K time slot starting from a $n_0 = (O \cdot 2^\mu + \lfloor (i + t_{off\_RMSI}) \cdot M \rfloor) \bmod N_{slot}^{frame,\mu}$-th time slot for which a system frame number satisfy:

SFN$_C$ mod 2=0 when or $$\lfloor (O \cdot 2^\mu + \lfloor (i + t_{off\_RMSI}) \cdot M \rfloor) / N_{slot}^{frame,\mu} \rfloor \bmod 2 = 0,$$

or
SFN$_C$ mod 2=1 when $$\lfloor (O \cdot 2^\mu + \lfloor (i + t_{off\_RMSI}) \cdot M \rfloor) / N_{slot}^{frame,\mu} \rfloor \bmod 2 = 1,$$

as the information about the time domain candidate position of the CORESET of the RMSI associated with the SSB;

wherein i is an index number of the SSB, $t_{off\_RMSI}$ is the offset factor between the first candidate transmitting position of the SSB and the second candidate transmitting position of the SSB, M and O are configuration values, K is a preset value, μ represents different subcarrier spacings of the CORESET of the RMSI, and $N_{slot}^{frame,\mu}$ is a number of a time slot in a system frame.

16. The network device according to claim 15, wherein $t_{off\_RMSI}$ is a maximum number of the SSB transmitted in a first time interval under a current frequency band.

17. The network device according to claim 12, wherein the processor is configured to determine K time slot starting from the $n_0 = (T \cdot 2^\mu + O \cdot 2^\mu + \lfloor (i + t_{off\_RMSI}) \cdot M \rfloor) \bmod N_{slot}^{frame,\mu}$-th time slot for which a system frame number satisfy:

SFN$_C$ mod 2=0 when or $$\lfloor (T \cdot 2^\mu + O \cdot 2^\mu + \lfloor (i + t_{off\_RMSI}) \cdot M \rfloor) / N_{slot}^{frame,\mu} \rfloor \bmod 2 = 0,$$

or
SFN$_C$ mod 2=1 when $$\lfloor (T \cdot 2^\mu + O \cdot 2^\mu + \lfloor (i + t_{off\_RMSI}) \cdot M \rfloor) / N_{slot}^{frame,\mu} \rfloor \bmod 2 = 1,$$

as the information about the time domain candidate position of the CORESET of the RMSI associated with the SSB;

wherein T is the time offset of the start position of the half frame where the SSB is located relative to the nearest even system frame boundary before the time domain position where the SSB is located, i is an index number of the SSB, $t_{off\_RMSI}$ is the offset factor between the first candidate transmitting position of the SSB and the second candidate transmitting position of the SSB, M and O are configuration values, K is a preset value, μ represents different subcarrier spacings of the CORESET of the RMSI, and $N_{slot}^{frame,\mu}$ slot is a number of a time slot in a system frame.

18. A non-transitory storage medium, storing an executable program, and implementing the information processing method according to claim 1 when the executable program is executed by a processor.

* * * * *